United States Patent [19]

Hagemeyer et al.

[11] Patent Number: 5,500,459
[45] Date of Patent: Mar. 19, 1996

[54] HEAT-SEALING OF SEMICRYSTALLINE POLYMERS WITH METALS

[75] Inventors: Alfred Hagemeyer, Ludwigshafen; Hartmut Hibst, Schriesheim, both of Germany; Dieter Baeuerle, Altenberg, Austria; Johannes Heitz, Freiburg, Germany

[73] Assignee: BASF Magnetics GmbH, Mannheim, Germany

[21] Appl. No.: 497,337

[22] Filed: Jun. 30, 1995

Related U.S. Application Data

[63] Continuation of Ser. No. 124,029, Sep. 21, 1993, abandoned.

[30] Foreign Application Priority Data

Sep. 23, 1992 [DE] Germany .................... 42 31 810.6

[51] Int. Cl.⁶ .................... C08J 3/28; B29C 65/06; B05D 3/06
[52] U.S. Cl. .................... 523/300; 156/73.5; 156/272.2; 156/273.3; 204/157.61; 250/492.1; 427/558; 428/425.8; 428/457; 428/458; 428/463
[58] Field of Search .................... 523/300; 156/73.5, 156/272.2, 273.3; 204/157.61; 250/492.1; 427/54.1; 428/425.8, 457, 458, 463

[56] References Cited

U.S. PATENT DOCUMENTS

| | | | |
|---|---|---|---|
| 3,081,485 | 3/1963 | Steigerwald | 18/1 |
| 4,822,451 | 4/1989 | Ouderkirk et al. | 156/643 |
| 4,868,006 | 9/1989 | Yorkgitis et al. | 427/53.1 |
| 5,032,209 | 7/1991 | Shinbach et al. | 156/272.6 |

OTHER PUBLICATIONS

Database WPI *Derwent Publications, Ltd.*, AN 90-003344 [01] (English abstract of JP-A-1 286 212). Also submitted—Patent Abstracts of Japan for same Japanese application.

*J. of Applied Polymer Science*, vol. 45, pp. 1679–1683, (1992).

H. Yokoya and R. S. Poster, J. Appl. Polymer Sci. 44 (1992), 1679–1683.

*Primary Examiner*—Kriellion S. Morgan
*Attorney, Agent, or Firm*—Keil & Weinkauf

[57] ABSTRACT

Semicrystalline polymers are heat-sealed with metals under pressure and at a temperature between the glass transition temperature and the softening temperature of the polymer by prior exposure of the polymer surface to UV radiation produced by the decomposition of excimers in the wavelength range of from 120 to 400 nm and with an energy density below the ablation threshold.

6 Claims, No Drawings

HEAT-SEALING OF SEMICRYSTALLINE POLYMERS WITH METALS

This application is a continuation of application Ser. No. 08/124,029, filed on Sep. 1, 1993 now abandoned.

The present invention relates to a process for heat-sealing semicrystalline polymers with metals under pressure and at a temperature between the glass transition temperature and the softening temperature of the polymer, by prior exposure of the polymer surface to UV radiation.

The high mechanical strength of many polymers is based on the semicrystalline structure of these materials. Such semicrystalline polymers consist of a mixture of amorphous and crystalline regions. The crystalline regions are substantially ordered and comprise regions whose polymer chains form a lattice structure due to folding of the chains of the various chemical building blocks of which the chains are composed. In contrast, the polymer chains in the unordered amorphous regions are in the form of random coils. When these semicrystalline polymers are heated above their softening temperature, the crystalline arrangement is destroyed, as shown by X-ray diffraction investigations. Rapid cooling following the heating process gives a material having a completely amorphous character.

This process has already been used for the lamination of polyethylene terephthalate (PET) films with chromium-plated steel (H. Yokoya and R. S. Poster, J. Appl. Polymer Sci. 44 (1992), 1679–1683). The PET material is heated to above its melting point and is bonded with the steel under pressure. However, this process cannot be used whenever the specific mechanical properties of the semicrystalline polymers are important and are required also after bonding with another material.

The effect of the conversion of PET films into amorphous form has also been used for reducing the coefficient of friction and for autoadhesion. In the case of semicrystalline polymers having a sufficiently high absorption coefficient, as is the case, inter alia, for PET, exposure to UV light of suitable wavelength can produce thin amorphous surface layers with simultaneous chain cleaveage and formation of oligomeric components. This is effected by overheating of the thin surface layer whose thickness is from a few nanometers to a few hundred nanometers. For example, U.S. Pat. No. 4,868,006 discloses that semicrystalline PET films exposed to UV radiation of an excimer laser having a wavelength of from 193 to 248 nm and the quasi-amorphous regions formed by melting on the surface can then be exposed to a material which induces crystallization, eg. acetone, methylene chloride or chloroform, in order thus to obtain polyester film surfaces whose coefficients of static and kinetic friction are lower. A similar procedure is adopted in U.S. Pat. No. 4,822,451. Here, the amorphous surface layer serves, inter alia, for reducing the optical reflection, increasing the transmission and improving the adhesion of coatings and the autoadhesion.

It is an object of the present invention to provide a process for the heat-sealing of semicrystalline polymers with metals at elevated temperatures and under pressure, in which the mechanical properties of the semicrystalline material forming the adhesive bond are not adversely affected.

We have found that this object is achieved by a process for heat-sealing semicrystalline polymers with metals under pressure and at a temperature between the glass transition temperature and the softening temperature of the polymer by exposing the polymer surface intended for bonding to UV light, if the surface intended for bonding is exposed to UV radiation produced by the decomposition of excimers in the wavelength range from 120 to 400 nm with an energy density below the ablation threshold.

In an advantageous embodiment of the novel process, the UV radiation is produced by a UV laser as a radiation source, this UV laser being in particular an excimer laser whose wavelength is 248 nm (KrF) or 308 nm (XeCl).

Such excimer lasers are known. When they are used for the novel process, the repetition rate is from 1 to 1,000 Hz, and suitable pulse lengths are from 10 to 100 ns.

In another advantageous embodiment of the novel process, UV radiation is produced by an incoherent UV excimer lamp as a radiation source, the wavelength being in particular 172 nm ($Xe_2$), 222 nm (KrCl) or 308 nm (XeCl).

Exposure of the polymer to radiation according to the novel process in the defined wavelength range of the UV radiation is effected using an energy density which is below the ablation threshold for the particular polymer and the wavelength used. The ablation threshold is defined as the energy density at which there is still no ablation, ie. at which there is still no significant removal of material. To determine it, the ablation rates are measured at various energy densities. If the ablation rates are plotted semilogarithmically against the energy densities used, the point of intersection with the axis of the energy density after extrapolation is defined as the ablation threshold. The ablation rate of a UV source is determined, for example, by focusing an aperture exposed to the UV radiation onto the polymer with a lens, circular holes of different depths being formed in the polymer surface depending on the energy density of the UV beam. The ablation threshold can be determined in a particularly simple manner using a UV laser. For this purpose, the measured etching rate is first determined as the ratio of the particular depth of the hole in the polymer to the number of pulses. This value is plotted against the logarithm of the energy density, ie. the ratio of the pulse energy to the area of the hole in the substrate. The point of intersection of the extrapolation line with the axis of the energy density then defines the threshold energy density for ablation.

The semicrystalline polymers suitable for the novel process are known. Polyethylene terephthalate (PET), polyimide (PI), polyethylene naphthalate (PEN), polyamide (PA), polybutylene terephthalate (PBT), polyacrylonitrile (PAN), poly-p-phenylene, polyurethanes (PUR) and polysulfones (PSU) are preferred.

The metals to be bonded to these polymers are predominantly Co, Cr, Ni, Pt or alloys thereof and Al, Cu, Fe, steel, Ag, Au, Ti, Zr, Zn or Sn.

In a preferred use of the novel process, the metals to be bonded are in the form of coherent thin metal layers. Such metal layers are in general cobalt-containing or cobalt/chromium-containing, eg. Co-Ni-Cr, Co-Pt, Co-Ni-O, Co-Cr containing from 15 to 35 atom % of chromium, cobalt/nickel layers containing more than 10 atom % of nickel or cobalt/nickel/oxygen layers containing more than 10 atom % of nickel and from 3 to 45 atom % of oxygen. However, corresponding thin metal layers based on iron are also known. These layers are produced by a PVD method, for example by evaporation, electron beam vaporization, sputtering, ion plating or application of the metal components by an electron arc method. Vapor deposition and sputtering are preferred. The metal layers which are produced in this manner and are often ferromagnetic are from 20 to 500 nm thick.

The stated polymers are then exposed, by the novel process, to UV radiation of an excimer laser with an energy density below the ablation threshold. This threshold energy density is wavelength-dependent and differs for the different polymers. For PET, it is in general from 10 to 200 $mJ/cm^2$. For example, the threshold energy for Mylar PET films at an excimer laser wavelength of 248 nm is about 40 mJ/cm$^2$, while the threshold at a wavelength of 308 nm is about 170 mJ/cm$^2$. In order to carry out the novel process in an advantageous manner, a UV excimer laser is preferably used and the substrate is exposed to small numbers of pulses, ie. from 1 to 25 pulses/unit area, under reduced pressure or in an oxygen, nitrogen, argon, ammonia or Freon atmosphere (up to 1,000 mbar).

A particularly interesting application of the novel process is the use of thin semicrystalline UV-irradiated polymer films as heat-sealing films, for example in a peel test.

A peel tests is a known method for evaluating the adhesion of sufficiently thick top layers on rigid or flexible substrates. In this test, the coating is gripped by the clamping jaws in a tensile test apparatus and is pulled off from the substrate, and the peeling force required for this purpose is measured. In the case of very thin layers of only a few μm or in the sub-micrometer range, however, this direct method for the peel test cannot be used since the layer is too thin to be directly gripped by the clamping jaws of the tensile test apparatus. It is therefore necessary to rely on other methods of force induction into the laminate.

A standard test frequently used in the case of thin films is the Scotch® tape test, in which a pressure-sensitive self-adhesive tape (Scotch® tape or Tesa film) is stuck to the coating and then pulled off. However, the adhesive force of these commercial self-adhesive tapes is not sufficient to enable firmly adhering coatings to be pulled off.

Substantially improved adhesion of the subsequently applied auxiliary films to the coating can be achieved by using heat-sealing films (hotmelt films). In the case of thin metal layers on, for example, plastic substrates, the EAA peel test is frequently used [De Puydt et al., Surf. Interf. Anal. 12 (1988), 486]: for this purpose, an EAA heat-sealing film (Ethylene Acrylic Acid, VISTAFIX from UCB S.A., Gent, Belgium) is laminated (105° C., 75 kN/20 cm$^2$ contact pressure, 20 s) with the metal side of the layer system (for example a flexible magnetic thin-layer medium) in a heat press. The laminate is then cut into 1 cm wide strips. The side facing away from the EAA film, ie. the substrate side, is stuck to a rigid metal support (Al sheet) by means of a double-sided self-adhesive tape. In a tensile test apparatus, the EAA film is clamped in the clamping jaws and subjected to tensile force. The force required to peel off the metal layer from the substrate at fixed angle of, for example, 180° to the plane of the layer is measured (180° EAA peel test). The peeling rate is typically 50 mm/min. The peeling force in N/cm standardized to the width of the strip is stated as a measure of the adhesion of the metal layer. Better adhesive strengths between metal and auxiliary film and hence higher possible peeling forces than in the case of Scotch tape or Tesa film are thus achieved, but the conventional heat-sealing films have the disadvantage of possessing only moderate internal strength and mechanical stability, so that, in the case of very firmly adhering coatings, the self-adhesive film is readily overextended and torn during the tensile test. The maximum measurable peeling force and hence the upward test limit in the EAA peel test (thin metal layers) is 4–5 N/cm, above which the internal cohesive force of the EAA film is exceeded.

To improve the peel test of thin metal layers, it is necessary to use a self-adhesive film which combines sufficiently high strength of the adhesive bond to the metal with adequate internal cohesive strength. Oriented PET films are known to be mechanically stable and strong films having a high tensile strength. Oriented PET has high internal cohesive strength but, as a semicrystalline and high molecular weight material, cannot be directly heat-sealed or welded to metals, and adhesion to metals cannot be achieved by simple lamination at elevated temperatures. The problems described can therefore be solved in a simple and advantageous manner by the novel process.

The Examples which follow illustrate the invention.

EXAMPLE 1

To test the adhesive strength of a 200 nm thick Co-Ni layer, applied by vapor deposition, to a 50 μm thick Upilex 50R PI film (from Ube), a 180° peel test was carried out. The heat-sealing film used was a semicrystalline Mylar 200D PET film (from DuPont, Tg=75° C.), which had been exposed beforehand under reduced pressure to a KrF excimer laser (248 nm) with an energy density of 20 mJ/cm$^2$ and with 6 pulses. The PET film pretreated by UV in this manner was welded to the metallized side of the Co-Ni-coated Upilex film in a heat press at 105° C. and 190 bar for 20 seconds. The PET film was then peeled off at an angle of 180 degrees. The metal layer could be peeled off smoothly, together with the laser-exposed PET film, from the Upilex film.

In a reference test, an attempt was made to weld an unexposed PET film to the Co-Ni layer under the same conditions as above. This was not possible. The unexposed PET film did not adhere to the metal layer.

In a further reference test, an attempt was made to peel off an EAA film laminated in the heat press with the same Co-Ni layer (on Upilex 50R) in a 180° peel test. This was not possible; the EAA film was overextended and tore since the adhesion was greater than the cohesive strength of the EAA film.

EXAMPLE 2

A Mylar 200D PET film was exposed to a KrCl excimer lamp (222 nm) with a power density of 5 mW/cm$^2$ in the air for 30 minutes. The film was then welded, in a heat press at 125° C. for 20 seconds at 190 bar, to the metal side of a Upilex 50R PI film coated with a 200 nm thick Co-Ni layer. The PET film adhered so firmly to the Co-Ni layer that the film tore when an attempt was made to peel it off.

In a reference test, an attempt was made to weld an unexposed PET film to the same Co-Ni-coated Upilex 50R film under the same conditions as above. This was not possible. The unexposed PET film did not adhere to the Co-Ni layer after hotpressing.

EXAMPLE 3

A semicrystalline Teonex PEN film from Teijin, having a $T_G$ of 125° C., a thickness of 7 μm and a crystallinity of about 40%, was exposed to UV light from an excimer laser at 248 nm and with 6.5 pulse/unit area under reduced pressure and then pressed onto a 100 μm thick Al sheet at 150° C., ie. about 25° C. above the glass transition temperature, for 20 seconds under 7.5 tonnes/20 cm$^2$. The following results were obtained in the peel test, as a function of the incident energy density:

| Unexposed | Laminated PEN film can be easily peeled off |
|---|---|
| 2.6 mJ/cm$^2$ | Can be easily peeled off |
| 5.0 mJ/cm$^2$ | Can be easily peeled off |
| 10 mJ/cm$^2$ | Can only be partly peeled off |

| Unexposed | Laminated PEN film can be easily peeled off |
|---|---|
| 15 mJ/cm$^2$ | Can be partly peeled off |
| 20 mJ/cm$^2$ | Can no longer be peeled off |
| 30 mJ/cm$^2$ | Cannot be peeled off |
| 40 mJ/cm$^2$ | Cannot be peeled off |

We claim:

1. A process for heat-sealing semicrystalline polymers with bonded metal which comprises: exposing the surface of the semicrystalline polymers to UV radiation produced by the decomposition of excimers in the wavelength range of from 120 to 400 nm with an energy density below the ablation threshold and thereafter bonding metal to the treated surface of the polymers under pressure and at a temperature between the glass transition temperature and the softening temperature of the polymer.

2. A process as defined in claim 1, wherein the exposure to UV radiation is carried out using a UV excimer laser.

3. A process as claimed in claim 1, wherein the exposure to UV radiation is carried out using an incoherent UV excimer lamp.

4. The process of claim 1, wherein the semicrystalline polymers are selected from the group consisting of polyethylene terephthalate, polyimide, polyethylene naphthalate, polyamide, polybutylene terephthalate, polyacrylonitrile, poly-p-phenylene, polyurethane and polysulfone.

5. The process of claim 4, wherein the metal to be bonded is in the form of coherent metal layers.

6. The process of claim 5, wherein the metal layers are cobalt containing or cobalt/chromium-containing layers.

* * * * *